United States Patent
Shin et al.

(10) Patent No.: US 7,705,890 B2
(45) Date of Patent: Apr. 27, 2010

(54) APPARATUS AND METHOD FOR PHOTOGRAPHING AN IMAGE IN A WIRELESS TERMINAL

(75) Inventors: Dae-Kyu Shin, Suwon-si (KR); Byoung-Hoon Kwak, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 314 days.

(21) Appl. No.: 11/835,277

(22) Filed: Aug. 7, 2007

(65) Prior Publication Data
US 2008/0030589 A1 Feb. 7, 2008

(30) Foreign Application Priority Data
Aug. 7, 2006 (KR) .................. 10-2006-0074181

(51) Int. Cl.
*H04N 5/225* (2006.01)
*H04N 13/02* (2006.01)
*H04N 7/18* (2006.01)

(52) U.S. Cl. .................. 348/220.1; 348/47; 348/153; 348/159

(58) Field of Classification Search ............. 348/47–48, 348/239, 211.11, 220.1, 143–160
See application file for complete search history.

(56) References Cited

U.S. PATENT DOCUMENTS 6,215,519 B1 * 4/2001 Nayar et al. ................ 348/159

| 2002/0030749 | A1 * | 3/2002 | Nakamura et al. ........... 348/220 |
| 2004/0212709 | A1 * | 10/2004 | Lee et al. ................. 348/333.01 |
| 2005/0146623 | A1 * | 7/2005 | Juen .......................... 348/220.1 |
| 2005/0200718 | A1 * | 9/2005 | Lee ............................ 348/220.1 |
| 2008/0024596 | A1 * | 1/2008 | Li et al. ........................ 348/47 |

FOREIGN PATENT DOCUMENTS

KR 1020040090146 10/2004

* cited by examiner

*Primary Examiner*—Jason Chan
*Assistant Examiner*—Pritham Prabhakher
(74) *Attorney, Agent, or Firm*—The Farrell Law Firm, LLP

(57) ABSTRACT

An apparatus and method are provided for simultaneously photographing a still image and a motion image in a wireless terminal with at least two cameras. A first camera photographs motion images in motion-image photography mode. A second camera photographs still images in the motion-image photography mode. A controller of the first camera controls the first camera to photograph the motion images in the motion-image photography mode. A controller of the second camera controls the second camera to photograph the still images in the motion-image photography mode. A control unit controls an operation for photographing the motion images through the controller of the first camera in the motion-image photography mode, and controls photographing the still images through the controller of the second camera, and controls an operation for storing the motion/still images photographed in the motion-image photography mode.

12 Claims, 3 Drawing Sheets

APPARATUS AND METHOD FOR PHOTOGRAPHING AN IMAGE IN A WIRELESS TERMINAL

PRIORITY

This application claims priority under 35 U.S.C. §119 to an application entitled "Apparatus and Method for Photographing an Image in a Wireless Terminal" filed in the Korean Intellectual Property Office on Aug. 7, 2006 and assigned Serial No. 2006-74181, the contents of which are incorporated herein by reference.

BACKGROUND OF THE INVENTION

1. Field of the Invention

The present invention generally relates to an apparatus and method for photographing an image, and more particularly to an apparatus and method for simultaneously photographing a still image and a motion image in a wireless terminal with at least two cameras.

2. Description of the Related Art

With the rapid development of communication, camera module and multimedia technologies, wireless terminals can obtain high-resolution images in the mega-pixel class beyond the size of Quarter Common source Intermediate Format (QCIF) (176×144) or Common source Intermediate Format (CIF) (352×288). There is no difficulty in storing and transmitting images using the compression scheme of Joint Pictures Expert Group (JPEG), for example. The wireless terminals implement a camcorder function using the motion-image compression scheme of Moving Picture Experts Group 4 (MPEG-4), H.26X, for example.

In addition, the wireless terminals implementing the transmission technology can perform not only voice communication but also video communication. For this, a 'dual camera phone' with two camera modules has been developed and produced.

When a user activates the capture key while viewing photographed images received from the camera of a wireless terminal, another image is captured. In response to storage selection of the user, the captured image is compressed and stored using the image compression scheme of JPEG, for example. In this case, the image size (of CIF, QCIF, Video Graphics Array (VGA), Extended Video Graphics Array (XVGA), etc.) and high or low image quality are predefined.

Since multiple images per second are captured when the wireless terminal photographs motion images, they are recorded in the Quarter Video Graphics Array (QVGA) or QCIF class due to a capacity or transmission problem and a performance problem. Similarly, the image size and quality are predefined and the captured images are compressed and stored using the motion-image compression scheme of MPEG and so on.

When a user desires to capture a still image while the wireless terminal photographs motion images, only a particular frame at a particular time is extracted while the photographed motion images are reproduced after the motion-image photography is completed. The extracted frame is converted into JPEG images. Because it is difficult for the motion images to have the quality of a general still-image due to problems in the wireless terminal capacity and transmission and so on, the user may not obtain images of the desired quality and size.

When the user desires to obtain a still image while the wireless terminal photographs motion images, the motion-image photography mode is stopped for still-image photography. Then, the still image is photographed in the still-image photography mode after the image size and quality are set. Subsequently, when the wireless terminal is switched to the motion-image photography mode again, the motion-image photography should be newly started after the image size and quality are set. During this operation, an object to be photographed may vary and also motion images may not be recorded in a continuous flow.

When a still-image photography attempt is made in a high image quality level while motion images are photographed in a wireless terminal with one camera, a motion-image flow is discontinuous and several frames are skipped, such that the motion images may be disjointed.

SUMMARY OF THE INVENTION

It is, therefore, an object of the present invention to provide an apparatus and method for photographing still image while a motion image is photographed in a wireless terminal with at least two cameras.

It is another object of the present invention to provide an apparatus and method that can simultaneously photograph a high quality still image and a motion image without stopping the motion-image photography in a wireless terminal with at least two cameras.

In accordance with an aspect of the present invention, there is provided an apparatus for simultaneously photographing a still image and a motion image in a wireless terminal with at least two cameras, including a first camera, a second camera, a controller for the first camera, a controller for the second camera and a control unit. The first camera is for photographing motion images in the motion-image photography mode of the wireless terminal; the second camera is for photographing still images in the still-image photography mode; the controller of the first camera is for controlling the first camera to photograph the motion images in the motion-image photography mode; the controller of the second camera is for controlling the second camera to photograph the still images in the motion-image photography mode; and the control unit is for controlling the operation of photographing the motion images through the controller of the first camera in the motion-image photography mode, controlling the operation for photographing the still images through the controller of the second camera, and controlling the operation for storing the motion/still images photographed in the motion-image photography mode.

In accordance with another aspect of the present invention, there is provided a method for simultaneously photographing a still image and a motion image in a wireless terminal with at least two cameras, including photographing motion images through a first camera in motion-image photography mode of the wireless terminal; photographing still images through a second camera and temporarily storing the photographed still images, when still-image photography is selected while the first camera photographs the motion images; and storing the photographed motion/still images when the motion-image photography mode ends.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
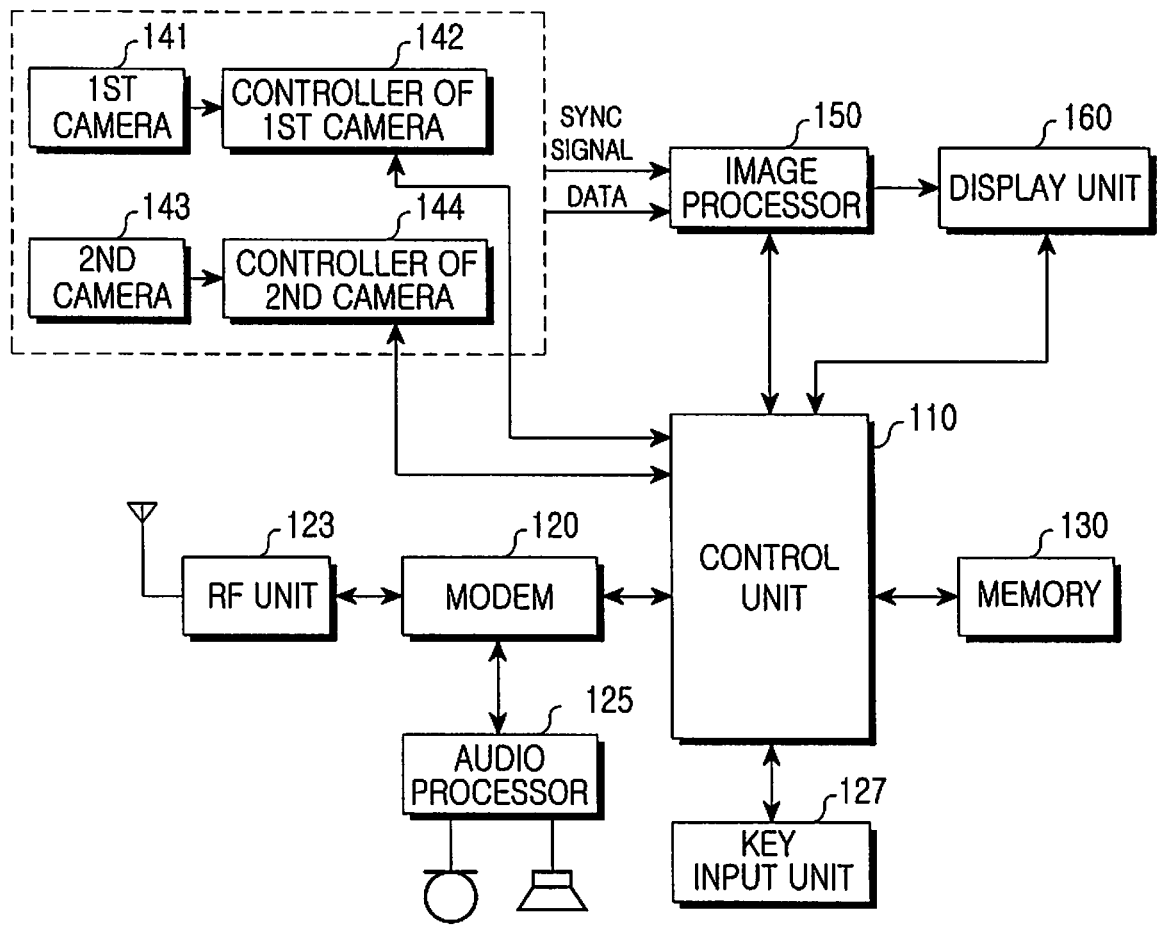
FIG. 1 is a block diagram of a wireless terminal in accordance with the present invention.

Preferred embodiments of the present invention will be described in detail herein below with reference to the accompanying drawings. In the drawings, the same or similar elements are denoted by the same reference numerals even though they are depicted in different drawings.

Referring to FIG. 1, a radio frequency (RF) unit 123 performs the wireless communication function of the wireless terminal. The RF unit 123 is provided with an RF transmitter for up-converting the frequency of a signal to be transmitted and amplifying the resulting signal, and an RF receiver for low-noise amplifying a received signal and down-converting the frequency of the resulting signal. A modulator-demodulator (modem) 120 is provided with a transmitter and a receiver for encoding and modulating the signal to be transmitted and for demodulating and decoding the received signal. An audio processor 125 can be configured with a coder-decoder (codec). The codec is provided with a data codec for processing packet data, etc., and an audio codec for processing the audio signal of voice, etc. Audio processor 125 converts the digital audio signal received from modem 120 into an analog signal through the audio codec to reproduce the analog signal or converts an analog audio signal generated from a microphone into a digital audio signal through the audio codec to output the digital audio signal to modem 120. The codec can be additionally provided or can be included in a control unit 110.

A memory 130 can be provided with program memory and a data memory. The program memory can store a program for controlling the overall operation of the wireless terminal and a program for controlling the operation for photographing a still image in motion-image photography mode using two cameras in accordance with the present invention. Further, the data memory functions to temporarily store generated data while the programs operate. Memory 130 temporarily stores still images, photographed by a second camera 143, for which an encoding process has not been performed, while a first camera 141 photographs a motion image in accordance with the present invention.

When the motion-image photography mode ends in accordance with the present invention, memory 130 stores the temporarily stored still images for which the encoding process has been performed and a file name mapped thereto.

Control unit 110 functions to control the overall operation of the wireless terminal. Control unit 110 can include modem 120 and the codec.

When motion-image photography is selected in accordance with the present invention, control unit 110 outputs a motion-image photography request signal to a controller 142 of first camera 141 and then controls an operation for performing the motion-image photography mode while displaying images received from first camera 141 on a display unit 160.

When still-image photography is set during the motion-image photography mode in which a motion image is photographed in the wireless terminal in accordance with the present invention, control unit 110 outputs a still-image photography standby request signal to a controller 144 of second camera 143 and then controls switching second camera 143 to still-image photography standby mode.

When the still-image photography is selected while first camera 141 photographs a motion image in accordance with the present invention, control unit 110 outputs a still-image photography request signal to controller 144 of second camera 143 and then controls an operation for photographing a still image in second camera 143.

When receiving still images photographed by second camera 143 from controller 144 thereof in accordance with the present invention, control unit 110 controls temporary storage of the still images in memory 130 in a state in which the encoding process has not been performed. Further, control unit 110 outputs a still-image photography standby request signal to controller 144 of second camera 143 and then controls switching second camera 143 to the still-image photography standby mode.

When the motion-image photography mode ends in accordance with the present invention, control unit 110 controls the operation for encoding the temporarily stored still images and storing the encoded still images in an associated file name.

First and second cameras 141 and 143 are provided with a camera sensor for capturing image data and converting an optical signal into an electrical signal and a signal processor for converting an analog image signal received from the camera sensor into digital data. The camera sensor is a charge-coupled device (CCD) sensor, and the signal processor can be implemented with a digital signal processor (DSP). The camera sensor and the signal processor can be integrated or stand-alone.

In accordance with the present invention, first camera 141 photographs a motion image in the motion-image photography mode under control of controller 142 thereof.

In accordance with the present invention, second camera 143 photographs a still image in the motion-image photography mode under control of controller 144 thereof.

When receiving a motion-image photography request signal from control unit 110, controller 142 receives images from first camera 141 and controls photographing a motion image while displaying the received images on display unit 160 through image processor 150.

When receiving a motion-image photography stop request signal from control unit 110, controller 142 controls an operation for stopping an image reception from first camera 141.

When receiving a still-image photography standby request signal from control unit 110, controller 144 switches second camera 143 to the still-image photography standby mode.

When receiving a still-image photography request signal from control unit 110, controller 144 controls second camera 143 to photograph a still image and then outputs photographed still images of one frame to control unit 110.

When receiving a still-image photography stop request signal from control unit 110, controller 144 controls second camera 143 to stop the still-image photography standby mode.

Image processor 150 functions to generate screen data for displaying image signals output from first and second cameras 141 and 143. Image processor 150 processes the image signals output from first and second cameras 141 and 143 in a frame unit, and outputs frame image data according to characteristic and size of display unit 160. Image processor 150 is provided with an image codec. Image processor 150 functions to compress the frame image data to be displayed on display unit 160 in a predefined scheme or recover original frame image data from the compressed frame image data. The image CODEC may be a Joint Pictures Expert Group (JPEG), Moving Picture Experts Group 4 (MPEG4) or wavelet codec. It is assumed that image processor 150 has an on-screen display (OSD) function. Image processor 150 can output on-screen display data according to size of an image to be displayed under control of control unit 110. Further, image processor 150 processes an image signal received from controller 142 of first camera 141 for controlling the motion-image photography in the motion-image photography mode in accordance with the present invention and then outputs the processed image signal to display unit 160.

Display unit 160 displays the image signal output from image processor 150 on the screen and displays user data output from control unit 110. Herein, display unit 160 can use a liquid crystal display (LCD). In this case, display unit 160 can be provided with an LCD controller, a memory for storing image data, and LCD elements. When the LCD is implemented in a touch screen fashion, it can operate as an input unit.

Further, display unit 160 displays images received from first camera 141 in the motion-image photography mode. Display unit 160 displays still images photographed in the motion-image photography mode when the motion-image photography mode ends in accordance with an exemplary embodiment of the present invention.

A key input unit 127 is provided with alphanumeric keys for inputting letters and numbers and function keys for setting various functions. Further, key input unit 127 is provided with a key for photographing a motion image and a key for photographing a still image in the motion-image photography mode.

An operation for photographing a still image in the motion-image photography mode in the above-described wireless terminal will be described in detail with reference to FIGS. 2A and 2B.

This embodiment will be described in detail with reference to FIG. 1 as well as FIGS. 2A and 2B.

Figure 2A:
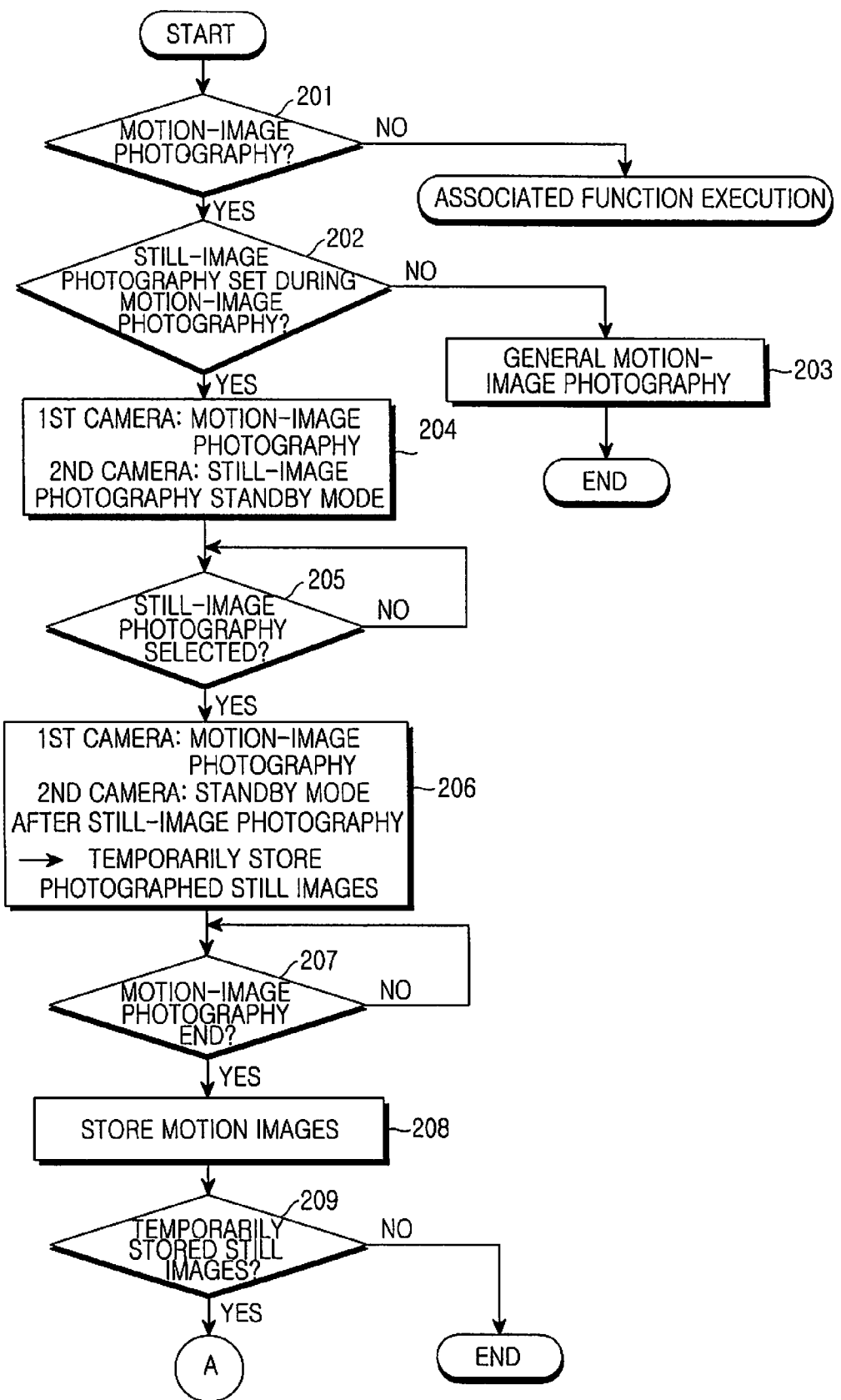
FIGS. 2A and 2B are flowcharts illustrating the operation for photographing a still image in motion-image photography mode in the wireless terminal in accordance with the present invention.
Figure 2B:
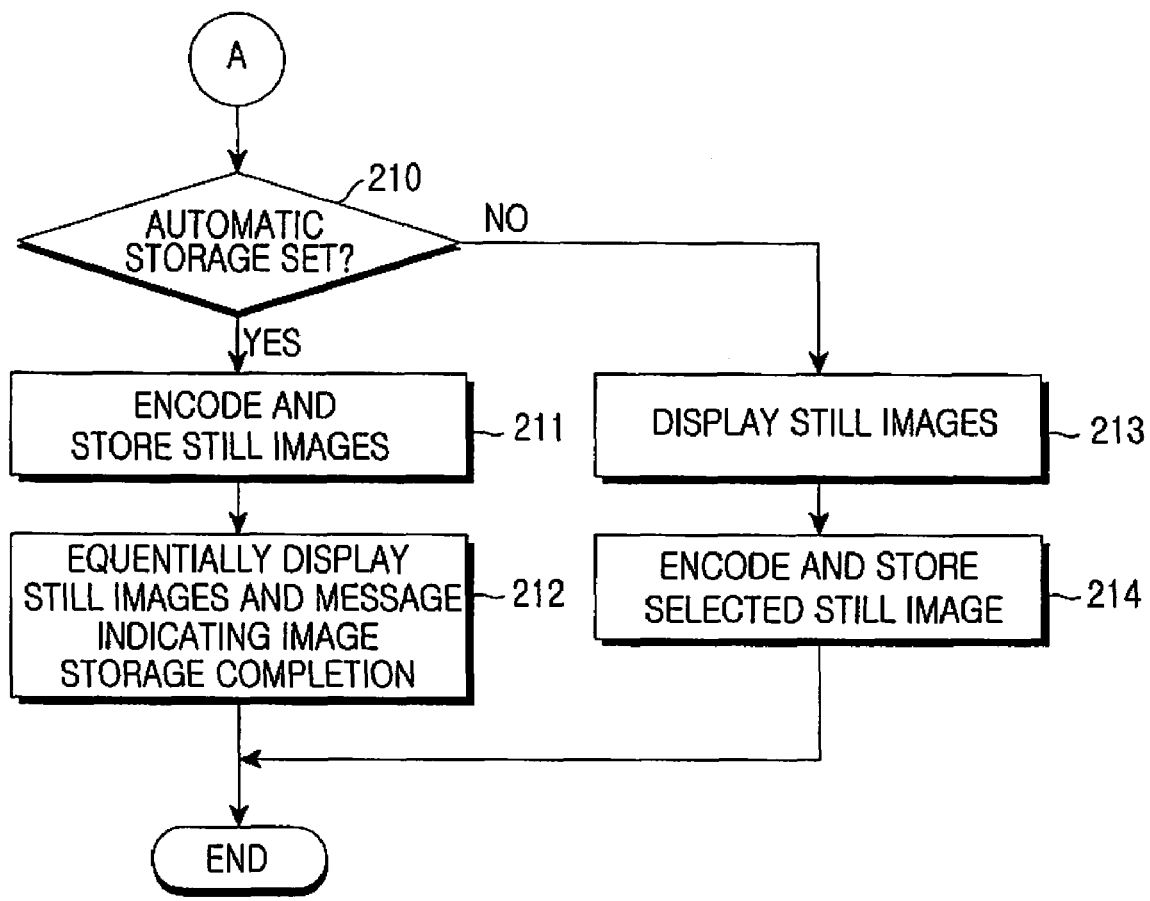

In FIG. 2A, when motion-image photography is selected in the wireless terminal, control unit 110 detects it and switches the wireless terminal to the motion-image photography mode in step 201. In the motion-image photography mode, control unit 110 outputs a motion-image photography request signal to controller 142 of first camera 141. When receiving the motion-image photography request signal from control unit 110, controller 142 of first camera 141 receives images of an object from first camera 141 and proceeds to step 204 to photograph a motion image while the received images are displayed on display unit 160 through image processor 150 in step 204.

In the motion-image photography mode, control unit 110 determines whether still-image photography is set while a motion image is photographed in the wireless terminal. If the still-image photography is not set while a motion image is photographed in the wireless terminal, control unit 110 detects it in step 202 and proceeds to step 203 in which first or second camera 141 or 143 photographs the motion image.

However, if the still-image photography is set while a motion image is photographed in the wireless terminal, control unit 110 detects it and then outputs a still-image photography standby request signal to controller 144 of second camera 143 in step 202. When receiving the still-image photography standby request signal from control unit 110, controller 144 switches second camera 143 to the still-image photography standby mode in step 204.

During the motion-image photography, the still-image photography can be preset by a user or can be set in the motion-image photography mode. When the still-image photography is set in the motion-image photography mode, basic information about a still-image size, the number of still images, image quality, automatic storage, and so on can be set.

When the still-image photography is selected in the motion-image photography mode in step 204, control unit 110 detects it in step 205 and then proceeds to step 206 to photograph a still image in the motion-image photography mode. The still-image photography can be selected by inputting the photography key provided on the wireless terminal during a predetermined time or inputting a key additionally provided to photograph a still image during the motion-image photography mode.

While first camera 141 photographs a motion image in step 206, control unit 110 outputs a still-image photography request signal to controller 144 of second camera 143. When receiving the still-image photography request signal from control unit 110, controller 144 switches second camera 143 to the still-image photography mode and then outputs still images of one frame photographed by e second camera 143 to control unit 110.

When receiving the still images from controller 144 of second camera 143, control unit 110 detects it and then stores, in memory 160, the received still images for which the encoding process has not been performed. Alternatively, control unit 110 can store, in memory 160, the received still images for which the encoding process has been performed according to storage setting for the still images.

Further, when receiving the still images from controller 144 of second camera 143, control unit 110 outputs a still-image photography standby request signal to controller 144 of second camera 143. When receiving the still-image photography standby request signal from control unit 110, controller 144 switches second camera 143 to the still-image photography standby mode.

When the end of the motion-image photography is selected while a still image is photographed in the motion-image photography mode in steps 205 and 206, control unit 110 detects it in step 207, outputs a motion-image photography stop request signal to controller 142 of first camera 141, and controls stopping the motion-image photography. Control unit 110 outputs a still-image photography stop request to controller 144 of second camera 143 and controls an operation for stopping the still-image photography standby mode.

When the motion-image photography mode ends, control unit 110 proceeds to step 208 to store photographed motion images in response to selection of the user.

When the motion-image storage process is completed, control unit 110 detects it and performs a process for storing still images photographed and temporarily stored in the motion-image photography mode.

Control unit 110 determines whether temporarily stored still images in memory 130 during the motion-image photography mode are present. When the temporarily stored still images are present, control unit 110 detects it in step 209 and determines whether the automatic storage of the still images is set.

When the automatic storage of the still images is set, control unit 110 detects it in step 210 and proceeds to step 211 to encode the temporarily stored images and store the encoded images in memory 130. When the still images are completely stored, control unit 110 displays the stored images and a message indicating that the still images have been stored on display unit 160 in step 212.

However, the automatic storage of the still images is not set, control unit 110 detects it in step 210 and then proceeds to step 213 to display the temporarily stored still images on display unit 160. Control unit 110 encodes a still image selected by the user from among the still images displayed on display unit 160 and then stores the encoded still image in memory 130 in step 214.

As is apparent from the above description, the present invention provides an apparatus and method for simultaneously photographing a still image and a motion image in a wireless terminal with at least two cameras. Thus, a user can obtain a high-quality still image at a desired time without affecting the motion image.

Although the wireless terminal has been described in the preferred embodiments of the present invention, those skilled in the art will appreciate that various modifications, additions, and substitutions are possible, without departing from the scope of the present invention. Therefore, the present invention is not limited to the above-described embodiments, but is further defined by the following claims and equivalents as interpreted to their full scope.

What is claimed is:

1. An apparatus for simultaneously photographing a still image and a motion image in a wireless terminal with at least two cameras, comprising:
    a first camera for photographing motion images in motion-image photography mode of the wireless terminal;
    a second camera for photographing still images in the motion-image photography mode;
    a first controller for controlling the first camera to photograph the motion images in the motion-image photography mode;
    a second controller for controlling the second camera to photograph the still images in the motion-image photography mode, and to temporarily store the still images when still-image photography is selected while the first camera photographs the motion images; and
    a control unit for controlling an operation for photographing the motion images through the first controller in the motion-image photography mode, and
    for controlling an operation for photographing the still images through the second controller, determining whether automatic storage of the still images is set in the motion-image photography mode, automatically encoding and controlling an operation for storing the motion/still images photographed in the motion-image photography mode when the automatic storage is set, and encoding and storing the temporarily stored still images according to the selection of a user when the automatic storage is not set.

2. The apparatus of claim 1, wherein the second controller switches the second camera to still-image photography standby mode when receiving a still-image photography standby request signal from the control unit in the motion-image photography mode.

3. The apparatus of claim 1, wherein the second controller switches the second camera to still-image photography mode when receiving a still-image photography request signal from the control unit in the motion-image photography mode, and outputs the photographed still images to the control unit.

4. The apparatus of claim 1, wherein the control unit outputs a still-image photography standby request signal to the second controller in the motion-image photography mode and controls switching the second camera to still-image photography standby mode.

5. The apparatus of claim 1, wherein the control unit temporarily stores received still images when receiving the still images from the second controller in response to a still-image photography request signal output in the motion-image photography mode.

6. The apparatus of claim 5, wherein the control unit outputs a still-image photography standby request signal to the second controller when receiving the still images from the second controller and controls switching the second camera to still-image photography standby mode.

7. The apparatus of claim 5, wherein the control unit encodes and stores the temporarily stored still images when the motion-image photography mode ends.

8. A method for simultaneously photographing a still image and a motion image in a wireless terminal with at least two cameras, comprising the steps of:
    photographing motion images through a first camera in a motion-image photography mode;
    photographing still images through a second camera and temporarily storing the photographed still images, when still-image photography is selected while the First camera photographs the motion images; and
    storing the photographed images when the motion-image photography mode ends,
    wherein the step of storing the temporarily stored still images comprises the steps of:
    determining whether automatic storage of the still images is set when the temporarily stored still images are present;
    automatically encoding and storing the temporarily stored still images when the automatic storage is set; and
    encoding and storing the temporarily stored still images according to the selection of a user when the automatic storage is not set.

9. The method of claim 8, further comprising:
    determining whether the still-image photography is set while the motion images are photographed in the motion-image photography mode; and
    switching the second camera to still-image photography standby mode when the still-image photography is set while the motion images are photographed.

10. The method of claim 8, wherein the still images are photographed by switching the second camera to a still-image photography mode when the still-image photography is selected while the first camera photographs the motion images.

11. The method of claim 8, wherein the second camera is switched to a still-image photography standby mode after the still images photographed by the second camera are temporarily stored.

12. The method of claim 8, where in the step of storing the photographed motion/still images comprises:
    storing the photographed motion images when the motion-image photography mode ends;
    determining whether the temporarily stored still images are present after the motion images are stored; and
    encoding and storing the temporarily stored still images when the temporarily stored still images are present.

* * * * *